March 5, 1963    W. P. SCHMITTER    3,079,773
COUPLING
Filed April 20, 1961    2 Sheets-Sheet 1
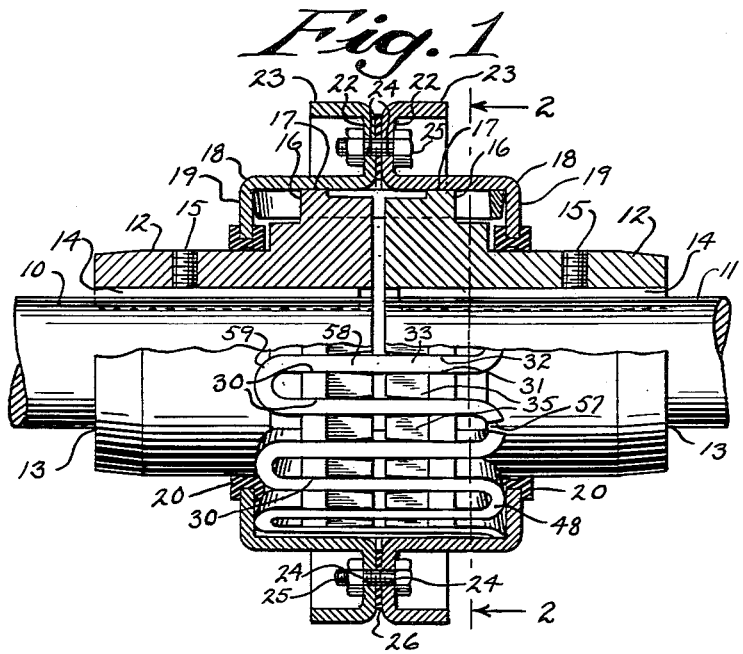
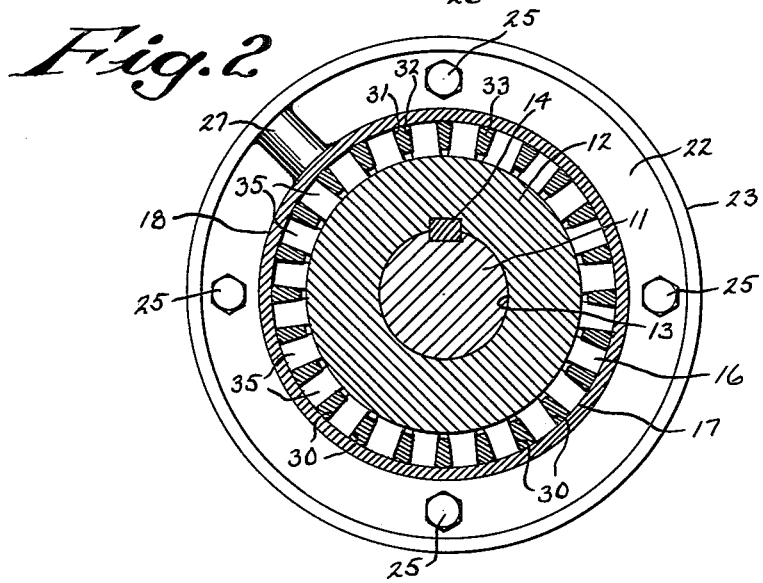
INVENTOR
WALTER P. SCHMITTER, DECEASED
BY  A. LOUISE SCHMITTER
ROBERT V. ABENDROTH,
CO-EXECUTORS
BY *Adrian L. Bateman, Jr.*
ATTORNEY United States Patent Office 3,079,773
Patented Mar. 5, 1963

3,079,773
COUPLING
Walter P. Schmitter, deceased, late of Wauwatosa, Wis., by A. Louise Schmitter, Wauwatosa, and Robert V. Abendroth, Whitefish Bay, Wis., co-executors, assignors to The Falk Corporation, Milwaukee, Wis., a corporation of Wisconsin
Filed Apr. 20, 1961, Ser. No. 105,529
10 Claims. (Cl. 64—15)

This invention relates to flexible couplings of the type utilizing a continuous serpentine metallic grid as a resilient torque transmitting means, and more particularly, to a coupling of that type in which the grid means and complementary coupling hub slots are provided with tapered cross sections.

Previous couplings of the aforesaid type have suffered from at least two major shortcomings. First, the couplings are difficult to assemble, particularly in the larger sizes wherein interference from tooth edges makes it necessary to distort the grid appreciably during assembly and to assemble the same by forceful methods utilizing hammers. One method which has been suggested for facilitating the assembly of large size steel grid couplings is to utilize a plurality of grids either stacked vertically or laminated as illustrated, for example, in Bibby Patent No. 1,891,969. The aforesaid solution to the problem actually amounts to a finesse rather than a direct approach as the forceful methods alluded to must still be used due to the continued presence of tooth interference. Further, it has been found that the use of multiple, vertically stacked grids generally results in early failure of the outermost grid, which carries the major portion of the torque load transmitted by the coupling.

Second, previous metallic grid couplings have tended to restrict the axial freedom or float of the shafts to which they are coupled due to the interference between the grid and the tooth resulting from grid distortion created during assembly or disassembly. Accordingly, it is a principal object of this invention to provide a steel grid coupling which may be easily assembled without force and, when assembled, provides freedom for axial float of the shafts to which the unit is assembled.

Ideally, a coupling should provide the smallest (diameter and length) possible connection between two shafts of a given diameter which is capable of carrying the maximum shaft torque without failure. Previous serpentine grid couplings have been incapable of approaching this ideal because difficult assembly made impractical the use of grids of strength approaching the strength of the coupling hub teeth. The deficiency has made it impossible to reduce diameters of previous rectangular serpentine grid couplings without concurrent sacrifice in load capacity. An important object of the invention is to provide a coupling structure in which design parameters become available to permit precise control of relative strength between the grid and coupling hub teeth and, hence, provide couplings which may approach ideal to an extent heretofore impossible.

According to this invention, the metallic serpentine grid members are formed from stock having a trapezoidal rather than a rectangular cross section and the peripheral teeth on the hub members are provided with grid receiving slots having their side faces flared in planes departing from radial planes passing through the axis of the coupling, the departure from radial being in a direction to provide less material at the tooth tips and more at their roots.

The aforementioned and other objects are accomplished in the structure described fully hereafter. For purposes of disclosure, one embodiment of the invention is described and is shown in the accompanying drawings in which, FIG. 1 illustrates in side elevation, partly in perspective and partly in section, a coupling in accordance with the present invention, FIG. 2 is a sectional view of the coupling in FIG. 1 taken along the plane of line 2—2, FIG. 3 is a fragmentary sectional view through a hub showing the teeth thereof with grid members seated in the slots therebetween and illustrating a condition of preferred minimum grid and tooth taper.

Figure 3:
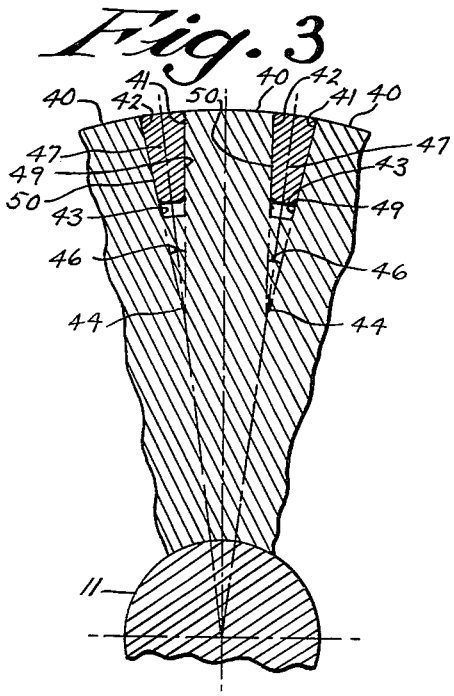

Referring to the details of the drawings, it may be seen in FIG. 1 that the coupling of the present invention is adapted to provide a connection between a driving shaft 10 and a driven shaft 11. The present coupling will permit joining such shafts in a driving relationship even though there exists angular or parallel misalignment between the axes of the shafts 10 and 11. Furthermore, as will be brought out subsequently, the coupling of the present invention will dampen shock loads imposed upon the driven shaft and will also provide resiliency between driving shaft 10 and driven shaft 11.

The coupling comprises a pair of identical hub members 12, which may be bored at 13 to receive the driver and driven shafts and may further be provided with slots to receive keys 14 to ensure rotation of the hubs with the shaft seated therein. The keys 14 may be fixed relative to hubs 12 and shafts 10 and 11 by tightening set screws 15, thus assuring rotation of the hubs 12 with their respective shafts and freedom from axial floating between the hub and shaft. Each hub is provided with a flange 16 peripherally disposed about the portion of the hub adapted to be placed in facing relationship with the adjacent hub. It may be observed that each flange 16 is provided with a raised cover supporting surface 17 projecting outwardly as an additional flange.

Two coupling cover portions, which may be identical and are indicated generally by the numeral 18, are provided to shield the coupling from the entrance of dust and grit and also to provide a lubricant retainer housing for the articulating portions of the coupling. As is apparent in FIG. 1, each cover portion 18 has an inwardly turned flange 19 which seats in a resilient sealing ring 20, the ring 20 in turn being seated upon the outer periphery of hub 12. The resilient sealing ring 20 forms no part of the present invention and may be formed of rubber, neoprene or other resilient materials resistant to deterioration in the presence of lubricants. The cover portions further comprise an upwardly turned flange 22 and an outwardly turned flange 23. As may be observed in FIG. 1, the upwardly turned flange 22 is provided with a series of apertures 24 radially disposed around the flange for receiving bolts 25 adapted to bind the cover portions together for unitary rotation with the coupling. A gasket 26 may be inserted between the cover portions when the same are assembled to provide a lubricant tight fitting at their point of juncture. The outwardly turned flange 23 serves as a protective device to prevent accidental encounters with bolts 25 when the coupling is rotating at high speeds. As may be observed in FIG. 1, the coupling cover is supported by the identical sealing rings 20 and supporting surfaces 17. Lubricant under pressure may be supplied to the interior of the assembled coupling cover through channel 27 illustrated in FIG. 2.

Figure 5:
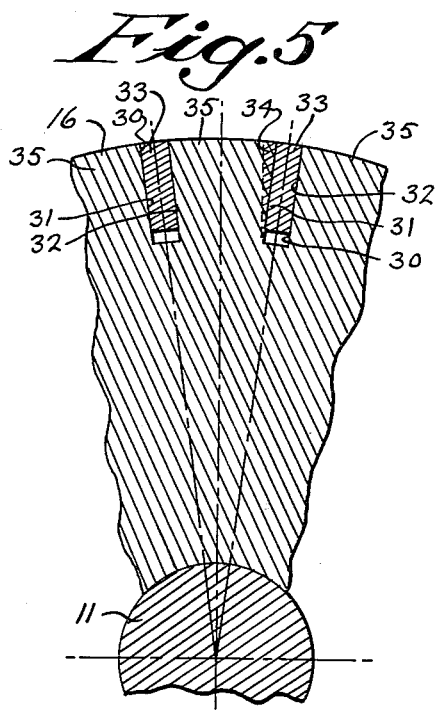
FIG. 5 is a fragmentary sectional view through a typical hub of prior art structures and illustrates the interference encountered in assembling such prior art couplings.
Figure 6:
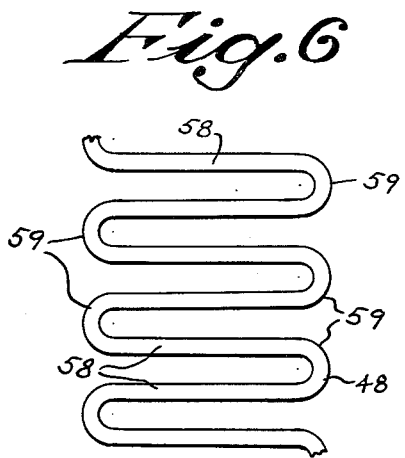
FIG. 6 is a plan view of a portion of a serpentine grid segment of the type utilized in the present invention.

Referring now to FIGS. 5 and 6, the present invention may be more readily understood by simultaneous reference to the prior art structure illustrated in FIG. 5 and the plan representation of a grid segment in FIG. 6. It is apparent in FIG. 5 that grid receiving slots 30 have been cut into hub flange 16 so that the sides 31 and 32 defining the slot are parallel, and the grid member 33 has a complementary rectangular cross section. It is readily apparent that difficulty in assembling the grids or placing the same in their slot is created by the interference provided by the double-hatched portion 34 of tooth 35. That is, each grid rung must be expanded or deflected open to fit over the tooth top and thereafter forced into its slot, which has been accomplished heretofore through the use of hammers, wedges and other forceful methods.

Turning now to FIG. 3, a tooth form in accordance with the present invention is illustrated in tooth 40. It may be observed that the tooth sides 41 and 42 are substantially parallel, resulting in the creation of a slot 43 in which sides 41 and 42 are tapered, which taper may be designated by the included angle indicated at 46. Placed within each slot is one rung 47 of a continuous serpentine grid segment indicated as 48 in FIG. 1, the grid rung and the slot having trapezoidal cross sections so that grid sides 49 and 50 mate with complementary sides 41 and 42 of slot 43. The included angle 46 illustrated in FIG. 3 is the minimum which provides for interference free assembly of grid 48 and is that which results from creating teeth 40 having parallel sides. It is apparent that the angle 46 will vary with the number of slots, the mathematical relationship for minimum taper or included angle being given by the expression $$\theta = \frac{360°}{N}$$

where $\theta$ is the included angle 46 in FIG. 3 and N is the total number of slots around the periphery of hub flange 16. It should be noted (as shown in FIG. 1) that the teeth of the present coupling may retain an inward flare along the axis of the hub to provide resiliency, in the manner previously known in this art.

Figure 4:
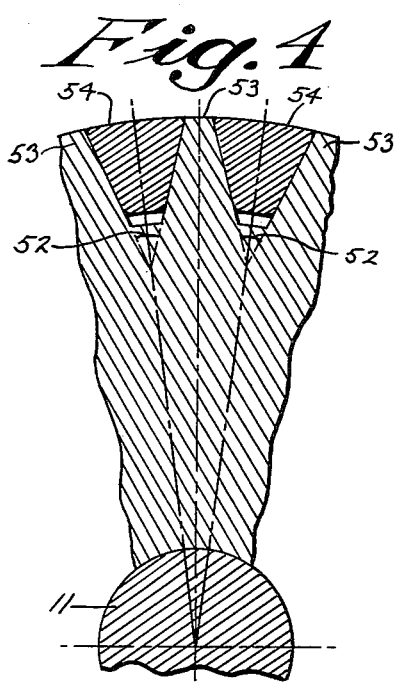
FIG. 4 is a sectional view similar to FIG. 3 except that it illustrates a condition of preferred maximum grid and tooth taper.

A condition of maximum practical taper is illustrated in FIG. 4 wherein included angle 52 may be seen to be larger than the angle 46 illustrated in FIG. 3. Through the practice of the present invention, it is possible to obtain stress loads through the coupling that increase its maximum load capabilities substantially because grids can be used having strengths matching the strength of the tooth, such as the tooth 53 illustrated in FIG. 4. As is observable in FIG. 4, the cross sectional area of grid rung 54 may be increased to equal or actually exceed the cross sectional area of tooth 53. A preferred maximum taper 52 is given by the expression $$\psi = 2 \arctan\left(\frac{\pi}{N} + \frac{H}{4b}\right)$$

where $\psi$=the maximum practical taper angle 52, N=number of slots around the periphery of flange 16, H=root section of the tooth and b=radial depth of the slot. This expression gives the greatest taper $\psi$ that may be used with a tooth of b depth and H tooth thickness, without causing a reduction in strength of the tooth. For practical sizes of couplings built in accordance with this invention, minimum tapers of about 2.5 degrees are preferred and maximum tapers of 46.6 degrees are preferred. It being understood that the preferred minimum taper and preferred maximum taper do not refer to couplings of the same flange peripheral diameter.

It should be understood that the grids referred to as continuous in the present description are intended to refer not only to grids having only one peripheral break such as that illustrated at 57 in FIG. 1, but also to grids which are segmented or, in other words, have several breaks when assembled around the peripheral flange of a completed coupling. It is intended, however, that the continuous serpentine grid be a segment having more than two rungs as at 58 in FIG. 6, joined continuously by end loops 59 in FIG. 6, the number of such grid segments being required to fill all of the peripheral slots depending upon the diameter of the coupling and the cross sectional area of the grid member.

For purposes of disclosure, couplings having corresponding or equal grid and slot taper angles have been illustrated, but it should be understood that the taper or included angle of the slot may be larger than the taper or included angle of the grid. Further, for purposes of disclosure, trapezoidal grid rungs have been illustrated and described, but it should be understood that the grid can be triangular in shape without adverse effect upon ease of assembly. Such a triangular configuration would require extending the grid rungs and slots in FIG. 3 to the apex indicated at 44. It should also be understood that the coupling hubs need not be identical as are those illustrated for purposes of disclosure, and the invention is equally applicable to single articulating arrangements in which one of the hubs carries an additional cover supporting flange for engagement with the coupling cover. Such arrangements are familiar to those skilled in this art and are frequently used in double piloted arrangements in which a relatively long shaft is supported between a pair of couplings, support for the shaft being provided through the coupling cover.

Experience with couplings of the type disclosed has shown that they may carry substantially higher service ratings than those of the prior art and that they exhibit substantially improved ability to permit and withstand axial float between the driver and driven shafts. Furthermore, couplings built in accordance with the present disclosure may be controlled with regard to load capacity, stiffness and resiliency by judicious selection of taper angles.

It is to be understood that the coupling selected for disclosure is illustrative only of the invention, and the scope of the invention is that of the following claims and not that of the disclosure.

What is claimed is:

1. A coupling for connecting driving and driven shafts comprising a pair of hub members connectable to said driving and driven shafts for rotation therewith, each of said hubs being provided with a plurality of axially extending teeth having their adjacent side faces defining slots therebetween, said slots being tapered to diverge outwardly from the axis of rotation of the hub; and a serpentine, metallic grid interlacing adjacent slots in said hubs to form a resilient torque transmitting element between said hubs, said grid having rungs of a tapered cross-section substantially mating with the tapered sides of the slots and end loops connecting said rungs in an area axially displaced from the hub teeth.

2. A resilient coupling for connecting driving and driven power transmission shafts comprising a pair of hubs adapted for attachment in facing relationship for rotation with said power transmission shafts, each of said hubs having a plurality of radially directed and axially extending slots formed around its outer periphery, said slots being defined by adjacent side surfaces tapering outwardly toward the periphery of the hubs; and a segmented, continuous, serpentine grid having rungs adapted, when seated in said slots, to substantially mate with the side surfaces of the slots.

3. A coupling for driving and driven shafts comprising a driving hub attachable to said driving shaft for rotation therewith and a driven hub attachable to said driven shaft for rotation therewith, each of said hubs having a plurality of mating radial slots disposed equidistantly around its periphery, each of said slots having a trapezoidal cross-section; and a segmented, continuous, metallic, serpentine grid interlinking said slots to form a torque transmitting element between said driving and driven hubs, said grid including end loops and rungs, said rungs having a trapezoidal cross-section.

4. A coupling for a pair of substantially coaxial shafts comprising a pair of substantially identical hubs, said hubs being attachable to the shafts for rotation therewith; each hub having a plurality of radially extending peripherally disposed teeth, the side surfaces of each tooth being substantially parallel; and a segmented, continuous, serpentine, metallic grid having a trapezoidal cross-section interleaved between said hub teeth to provide a resilient torque transmitting element between said hubs.

5. A coupling for connecting driving and driven shafts comprising a pair of hub members connectable to said driving and driven shafts for rotation therewith, each of said hubs being provided with a plurality of axially extending teeth having their adjacent side faces defining slots therebetween, said slots being tapered to diverge outwardly from the axis of rotation of the hub the minimum included angle of said taper being $$\frac{360°}{N}$$

where N equals the total number of slots in each hub member; and a serpentine, metallic grid interlacing adjacent slots in said hubs to form a resilient torque transmitting element between said hubs, said grid having a tapered cross-section substantially mating with the tapered sides of the slots.

6. A coupling for connecting driving and driven shafts comprising a pair of hub members connectable to said driving and driven shafts for rotation therewith, each of said hubs being provided with a plurality of identical, axially extending teeth having their adjacent side faces defining slots therebetween, said slots being tapered to diverge outwardly from the axis of rotation of the hub, the maximum included angle of said taper being less than $$2 \text{ arctang} \left(\frac{\pi}{N}+\frac{H}{4b}\right)$$

where N equals the number of slots in each hub member, H equals the root section of each tooth and b equals the radial depth of each slot; and a serpentine, metallic grid interlacing adjacent slots in said hubs to form a resilient torque transmitting element between said hubs, said grid having a tapered cross-section substantially mating with the tapered sides of the slots.

7. A resilient coupling for connecting driving and driven power transmission shafts comprising a pair of hubs adapted for attachment in facing relationship for rotation with said power transmission shafts, each of said hubs having a plurality of radially directed and axially extending slots formed around its outer periphery, said slots being defined by adjacent side surfaces tapering outwardly toward the periphery of the hubs, the included angle of said taper being between 2.5° and 46.0°; and a segmented, continuous, serpentine grid having rungs adapted, when seated in said slots, to substantially mate with the side surfaces of the slots.

8. A coupling for driving and driven shafts comprising a driving hub attachable to said driving shaft for rotation therewith and a driven hub attachable to said driven shaft for rotation therewith, each of said hubs having a plurality of mating radial slots disposed equidistantly around its periphery, each of said slots having a triangular, cross-section; and a segmented, continuous, metallic, serpentine grid interlinking said slots to form a torque transmitting element between said driving and driven hubs, said grid including end loops and rungs, said rungs having a triangular cross-section.

9. A resilient coupling for connecting driving and driven power transmission shafts comprising a pair of hubs adapted for attachment in facing relationship for rotation with said power transmission shafts, each of said hubs having a plurality of radially directed and axially extending slots formed around its outer periphery, said slots being defined by adjacent side surfaces tapering outwardly toward the periphery of the hubs; and a segmented, continuous, serpentine grid having identical rungs of tapered cross-section with their side surfaces tapering inwardly toward the axis of rotation of the hubs and adapted, when seated in said slots, to substantially mate with the side surfaces of the slots, the included angle of the taper of each slot being identical and greater than the included angle of the taper of the rungs.

10. A coupling for driving and driven shafts comprising a driving hub attachable to said driving shaft for rotation therewith and a driven hub attachable to said driven shaft for rotation therewith, each of said hubs having a plurality of mating radial slots disposed equidistantly around its periphery, said slots being defined by teeth in each hub and each of said slots having identical tapered cross-sections, the included angle of said taper falling between $$\frac{360°}{N} \text{ and } 2 \text{ arctang} \left(\frac{\pi}{N}+\frac{H}{4b}\right)$$

where N equals the number of slots in each hub, H equals the root section of each tooth and b equals the radial depth of each slot; and a segmented, continuous, metallic, serpentine grid interlinking said slots to form a torque transmitting element between said driving and driven hubs, said grid including end loops and rungs, said rungs having tapered cross-sections substantially mating with the tapered cross-sections of the slots.

References Cited in the file of this patent
UNITED STATES PATENTS

| | | |
|---|---|---|
| 2,479,278 | Tessendorf et al. | Aug. 16, 1949 |
| 2,701,456 | Brownstein | Feb. 8, 1955 |
| 2,885,871 | Wellauer | May 12, 1959 |